Patented Sept. 10, 1935

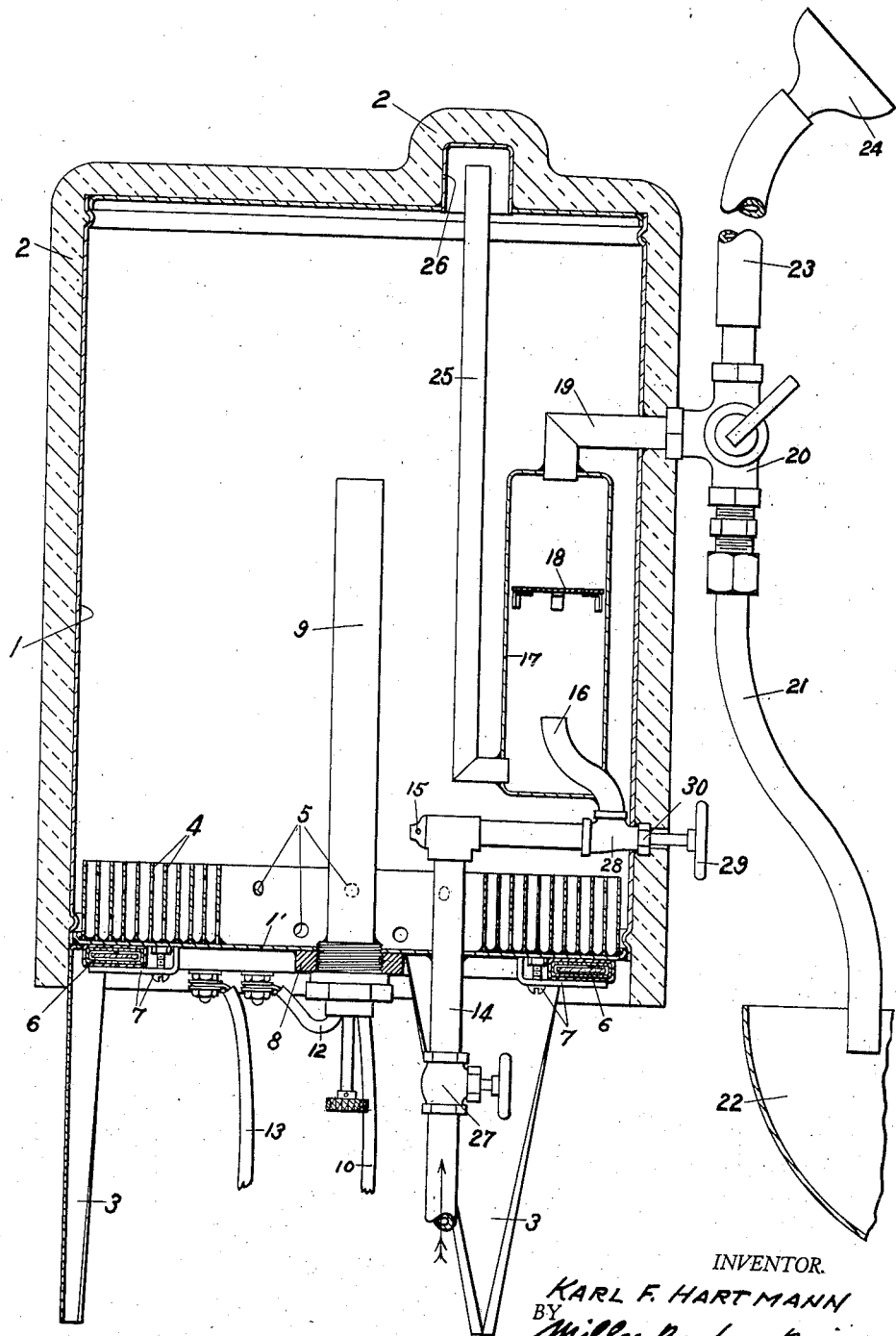

2,013,914

UNITED STATES PATENT OFFICE 2,013,914

ELECTRIC WATER HEATER

Karl F. Hartmann, San Francisco, Calif., assignor of one-half to Morgan J. Doyle, San Francisco, Calif.

Application July 27, 1932, Serial No. 624,958

5 Claims. (Cl. 219—39)

This invention relates to electric water heaters and has for its object an improved construction in an automatic storage type of heater which will have high efficiency and from which water of various temperatures may be drawn and which will be unusually quick to restore the heat extracted upon drawing hot water therefrom.

In the drawing accompanying this application the figure is a vertical section taken through the tank of the apparatus, but with some of the smaller parts and piping shown in full.

In further detail the apparatus comprises a cylindrical water container of any desired size 1, preferably of sheet copper, heat insulated over the outer sides as at 2 and provided with legs 3. This container has a flat bottom sheet 1' projecting upward from which is a series of sheet copper fins 4 in the form of spaced concentric rings welded or soldered at their lower edges to the bottom sheet of the container so as to form a thermal unit therewith, and the rings are several inches high and preferably perforated as at 5 in a staggered manner to facilitate the lateral circulation of water through the fins.

Below the bottom sheet and in close thermal contact therewith is a flat ring-shaped electric heating element 6 enclosed in a metal shell and held in tight contact with the bottom of the container by means of screw clamps 7 so that it can easily be replaced when burnt out. This heating element is of standard construction obtainable on the market and not involved in the present invention except in the fact that it is of flat ring form as stated.

At the center of the bottom sheet 1' is a screw-threaded boss 8 through which projects an electric thermostat 9 of any conventional construction adapted to break or make an electric connection at a predetermined high or minimum heat respectively, the precise construction of the thermostat and switch being of no importance except that it is suitably connected by wires 10, 12, 13 with a source of electric power and the heating ring 6 in a manner to switch the current on when the temperature drops below a predetermined point and switches it off when the temperature rises to a predetermined point, so as to tend to hold the water with which the container is filled at a constant hot temperature.

Cold water is admitted to the container through a pipe 14 projecting into the container and formed with one or more small outlets 15 directed toward the thermostat 9 and also another outlet 16 directed upwardly into a mixing chamber 17 provided with a perforated baffle at 14 and an upper outlet pipe 19 leading to a two-way valve 20 outside of the container and having a plain discharge pipe 21 extending from one outlet leading to the bowl 22 of a lavatory or other receptacle for use, and the other valve outlet fitted with a rubber hose 23 and rose spray 24, as for washing out the hair over the lavatory. In fact such installations for barbers is one of the principal uses of the apparatus.

The hot water is delivered to valve 20 by an upright pipe 25 in the container which enters the lower part of the mixing chamber 17 and projects at its its upper end above the water level within the container, or in fact above the upper head thereof into a small dome 26 an inch or two high, so that when valve 20 is open to either pipe 21 or 23 still no hot water will run unless valve 27 on cold supply pipe is opened. This admits cold water through relatively small openings 15 in direction of thermostat 9 near the bottom of the container so as to raise the water into dome 26 and overflow the hottest water in the container into pipe 25 and force it up through the mixing chamber to come out of whichever pipe 21 or 23 is open. It should be noted that valve 20 cannot close off pipe 19 as it simply switches it to either pipe 21 or 23 and one of these must therefore always be open, hence no pressure can build up in the container at all, and since the outflow is controlled from faucet 27 the container is always full. Pipe 25 going to the top of the container or above it into the dome cannot dribble water through valve 20 or start a siphonic action.

If the water is too hot for the use desired, a certain amount of cold water is admitted to the mixing chamber 17 from pipe 16 by opening valve 28 by means of a handle 29 extending in any suitable water-tight construction 30 through the container and accessible outside for turning.

Although the bottom of the container is not shown heat insulated, it is understood that this as well as the mechanism supported by it may all be enclosed in heat insulation with a corresponding gain in efficiency.

Minor changes within the spirit of the invention are intended to be covered in the following claims.

I claim:

1. An electric water heater comprising a sheet metal container, an electric heater in contact with the under side of the bottom of the container, sheet metal fins integrally secured to and extending upwardly within the container, a pipe for withdrawing hot water from the top of the container and means for admitting cold water to the lower part of the container to force out the hot water.

2. An electric water heater comprising a sheet metal container, an electric heater in contact with the under side of the bottom of the container, a pipe for withdrawing hot water from the top of the container, and means for admitting cold water to the lower part of the container to force out the hot water, said pipe provided with a two-way valve accessible outside of the container and leading to two branches either one of which is always open at its outer end to atmosphere depending on the position of said two-way valve.

3. An electric water heater comprising a sheet metal container, an electric heater in contact with the under side of the bottom of the container, a pipe for withdrawing hot water from the top of the container, and means for admitting cold water to the lower part of the container to force out the hot water, said pipe including a mixing chamber located within the container, and means for admitting cold water to said mixing chamber to temper the water therein before discharge.

4. A water heater comprising an upright cylindrical container, means for heating water in said container, a thermostat controlling the heating means to maintain the temperature of the water, a draw-off pipe normally open at its discharge end to atmosphere and open throughout its length to an inlet end within the water chamber at a point above the water level when no water is being drawn therethrough, a cold water supply pipe provided with a valve for delivering water to the lower part of the container to force the hot water out of said draw-off pipe and branched to deliver cold water into said draw-off pipe for tempering the same before discharge, and a control valve on said branch.

5. In an electric water heater including a storage tank, means for delivering cold water into the lower part of the chamber for heating, piping within said tank arranged for drawing off the hot water from the upper part of the storage chamber, and means independently controlled from outside of the heater for injecting cold water into the outflowing hot water in said piping at a point within the tank for tempering the outflowing water.

KARL F. HARTMANN.